United States Patent
Korngold et al.

(10) Patent No.: US 11,430,192 B2
(45) Date of Patent: Aug. 30, 2022

(54) PLACEMENT AND MANIPULATION OF OBJECTS IN AUGMENTED REALITY ENVIRONMENT

(71) Applicant: Google LLC, Mountain View, CA (US)

(72) Inventors: Joost Korngold, Sunnyvale, CA (US); Keith Schaefer, San Pedro, CA (US); Bryan Woods, Santa Clara, CA (US); Jay Steele, Santa Monica, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/250,114

(22) PCT Filed: Oct. 2, 2019

(86) PCT No.: PCT/US2019/054219
§ 371 (c)(1),
(2) Date: Nov. 30, 2020

(87) PCT Pub. No.: WO2020/072591
PCT Pub. Date: Apr. 9, 2020

(65) Prior Publication Data
US 2021/0183158 A1 Jun. 17, 2021

Related U.S. Application Data

(60) Provisional application No. 62/740,918, filed on Oct. 3, 2018.

(51) Int. Cl.
*G06T 19/00* (2011.01)
*G06F 3/01* (2006.01)
*G06T 15/60* (2006.01)

(52) U.S. Cl.
CPC ........... *G06T 19/006* (2013.01); *G06F 3/011* (2013.01); *G06F 3/017* (2013.01); *G06T 15/60* (2013.01)

(58) Field of Classification Search
CPC ....... G06T 19/006; G06T 15/60; G06F 3/011; G06F 3/017; G06F 3/04815
See application file for complete search history.

(56) References Cited

U.S. PATENT DOCUMENTS 9,685,005 B2 * 6/2017 Kjallstrom ............ G06T 19/006
10,339,721 B1 * 7/2019 Dascola ................. G06T 13/20
(Continued)

FOREIGN PATENT DOCUMENTS

WO 2012135553 A1 10/2012

OTHER PUBLICATIONS

International Search Report and Written Opinion for Application No. PCT/US2019/054219, dated Dec. 13, 2019, 15 pages.

*Primary Examiner* — Chante E Harrison
(74) *Attorney, Agent, or Firm* — Brake Hughes Bellermann LLP

(57) ABSTRACT

In a general aspect, a method can include: receiving, by an electronic device, data defining an augmented reality (AR) environment; receiving an indication to place an AR object on a reference surface in the AR environment; in response to the indication, displaying the AR object on the reference surface in the AR environment; performing a first gesture on an input device of the electronic device; in response to the first gesture, elevating the AR object a distance above the reference surface in the AR environment; performing a second gesture on the input device of the electronic device; and in response to the second gesture, moving the AR object in the AR environment.

17 Claims, 15 Drawing Sheets

7-1. Mobile device
7-2. Virtual character
7-3. Virtual character shadow representing that the character is on a surface
7-4. User places two fingers on top of a virtual character
7-5. User slides two fingers upwards along the device screen
7-6. Virtual character raises up from the surface it was placed on
7-7. Elevation visual affordance indicating height and point of origin of the character from the surface it has been elevated from
7-8. Virtual character's shadow shrinks slightly as character is elevated

(56) References Cited

U.S. PATENT DOCUMENTS

| | | | |
|---|---|---|---|
| 10,580,393 B2* | 3/2020 | Maezawa | G10H 1/00 |
| 10,607,415 B2* | 3/2020 | Leung | G06T 7/73 |
| 11,017,608 B2* | 5/2021 | Paul | G06F 3/04842 |
| 2010/0315413 A1* | 12/2010 | Izadi | G06F 3/0421 |
| | | | 345/419 |
| 2015/0363070 A1* | 12/2015 | Katz | G06F 3/017 |
| | | | 715/852 |
| 2017/0270715 A1 | 9/2017 | Lindsay et al. | |
| 2017/0287218 A1* | 10/2017 | Nuernberger | G06T 19/20 |
| 2018/0286126 A1* | 10/2018 | Schwarz | G06F 3/04845 |
| 2018/0300952 A1* | 10/2018 | Evans | G06F 3/04845 |
| 2020/0134297 A1* | 4/2020 | Maezawa | G06F 3/017 |
| 2020/0226814 A1* | 7/2020 | Tang | G06F 3/04842 |
| 2021/0090337 A1* | 3/2021 | Ravasz | G06F 3/012 |

\* cited by examiner 7-1. Mobile device
7-2. Virtual character
7-3. Virtual character shadow representing that the character is on a surface
7-4. User places two fingers on top of a virtual character 7-5. User slides two fingers upwards along the device screen
7-6. Virtual character raises up from the surface it was placed on
7-7. Elevation visual affordance indicating height and point of origin of the character from the surface it has been elevated from
7-8. Virtual character's shadow shrinks slightly as character is elevated 7-9. User releases two fingers and virtual character is let floating above the point it was originally placed on.
7-10. Elevation visual affordance 8-1. An ARCore identified surface (visualized for clarity)
8-2. Virtual character placed on identified surface
8-3. Virtual character shadow representing that the character is on a surface 8-4. User slides two fingers upwards along the device screen
8-5. Virtual character raises up from the surface it was placed on
8-6. Elevation visual affordance indicating height and point of origin of the character from the surface it has been elevated from
8-7. Virtual character's shadow shrinks slight as character is elevated 8-8. Virtual character previously elevated off of an identified surface using two-finger gesture
8-9. User repositioning character using one finger and dragging along the device screen.
8-10. An elevated surface (eg. A table or desk) that the user wishes to reposition the
      character to be on (identified as an ARCore surface)

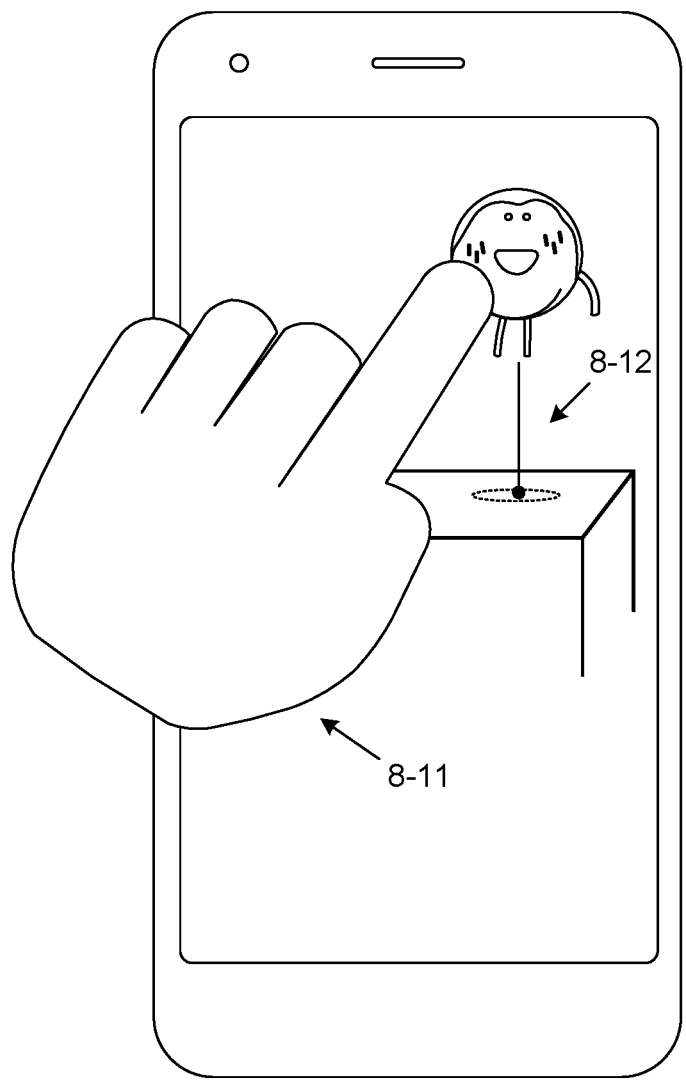

8-11. User drag the virtual character from the lower identified surface onto the elevated surface 8-12. Character is placed on a new elevated surface. The elevation that was applied to the character using the two finger gesture is maintained from one surface to another e.g., if a character is elevated 1 foott off its original surface, then repositioned to another elevated surface, the character would be 1 foot off the new elevated surface

FIG. 8D

PLACEMENT AND MANIPULATION OF OBJECTS IN AUGMENTED REALITY ENVIRONMENT

CROSS-REFERENCE TO RELATED APPLICATIONS

This application is a 35 U.S.C. 071 National Phase Entry Application from PCT/US2019/054219, filed on Oct. 2, 2019, entitled "PLACEMENT AND MANIPULATION OF OBJECTS IN AUGMENTED REALITY ENVIRONMENT", which claims priority to U.S. Provisional Application No. 62/740,918, filed on Oct. 3, 2018, the disclosures of which are incorporated by reference herein in their entireties.

TECHNICAL FIELD

This document relates, generally, to rendering of computer-generated objects in an augmented reality (AR) environment. More specifically, this document relates to approaches for placement, manipulation (e.g., elevating, moving, etc.) of object (e.g., AR objects) in an AR environment.

BACKGROUND

In the context of computer-based consumption of media and other content, it is becoming increasingly common to provide a user (viewer, participant, etc.) with immersive experiences. One field involves the presentation of virtual reality (VR) and/or augmented reality (AR) environments on a device, such as a smartphone or a tablet. In an AR environment, a person can watch a screen that presents at least both an aspect of a physical environment (e.g., a video or real-time image of a physical space) and an aspect of VR (e.g., a virtual object superimposed on the video or image) to provide an AR experience.

SUMMARY

This documents describes systems and methods for displaying an augment reality in which a user can place and manipulate virtual (e.g., computer-generated) objects in a view of a physical space. In a general aspect, a method can include: receiving, by an electronic device, data defining an augmented reality (AR) environment; receiving an indication to place an AR object on a reference surface in the AR environment; in response to the indication, displaying the AR object on the reference surface in the AR environment; performing a first gesture on an input device of the electronic device; in response to the first gesture, elevating the AR object a distance above the reference surface in the AR environment; performing a second gesture on the input device of the electronic device; and in response to the second gesture, moving the AR object in the AR environment.

The details of one or more implementations are set forth in the accompanying drawings and the description below. Other features will be apparent from the description and drawings, and from the claims.

BRIEF DESCRIPTION OF DRAWINGS

FIGS. 8A-8D are diagrams illustrating a sequence for manipulating an AR object (e.g., an elevated AR object) in an AR environment.

DETAILED DESCRIPTION

This document describes examples of device and methods for displaying an augmented reality (AR) environment to a user, where the user can place and interact (e.g., manipulate, elevate, move, interact with, etc.) with virtual objects in a physical space within the displayed AR environment. In some implementations, such virtual objects can include stickers, characters, sprites, animations, 3D renderings, and so forth.

Figure 1:
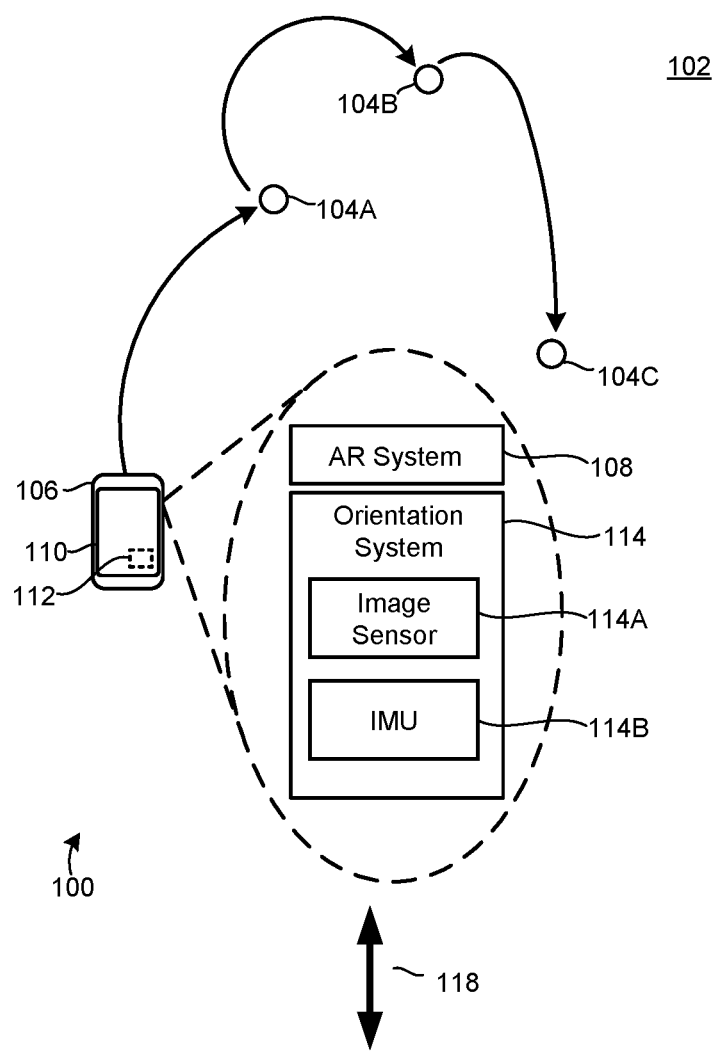
FIG. 1 shows an example of a system that can be used for generating an immersive experience by way of an augmented reality (AR) environment.
Figure 1:
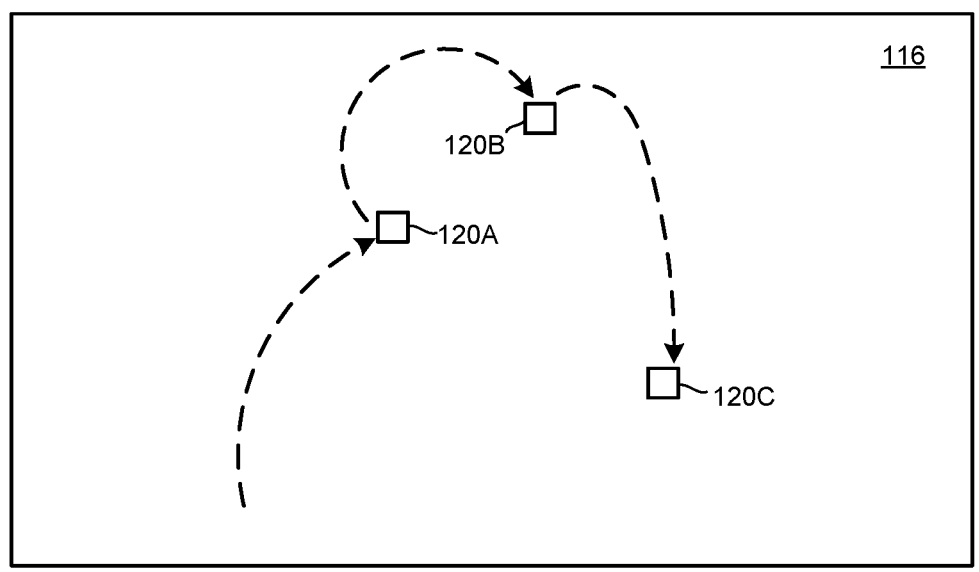

FIG. 1 shows an example of a system 100 that can be used for generating an immersive experience by way of an AR environment. In some implementations, the immersive experience allows the user (not shown) to see one or more AR (virtual, computer-generated, etc.) objects in combination with imagery of physical reality. For example, the immersive experience can allow the user to explore the AR environment by holding a device while moving about in a physical space. One or more AR objects can be place, by the user, in the AR environment relative to the physical reality, and the user can view, manipulate, elevate, etc., the placed AR objects within the AR environment. In some implementations, the user can keep the device stationary while viewing and interacting with AR environment. In some implementations, the user can interact with the AR objects through the physical space by moving the device to display corresponding physical locations of the physical space component of the AR environment. The physical location(s) can be monitored or otherwise determined using one or more approaches, including, but not limited to, optical, radio-based and/or acoustic position methodologies. Some implementations can also or instead be used in a virtual reality (VR) environment. For example, functionality described herein can be provided for observation on a head-mounted display, including, but not limited to, on a VR headset 1085 described below with reference to FIG. 9.

The system 100 is here shown in a space (physical space) 102, which can be any kind of physical space, including, but not limited to, a room, an office, a park, or other physical premises. The space 102, FIG. 1, is schematically shown from above. In some implementations, the space 102 can contain one or more physical structures (not shown), such as a table, a bench, trees, etc. In some implementations, the space 102 can contain no physical structures. The space 102 can be used as the visual background for an AR immersive experience, for example in that a user can view and interact with AR objects at various locations in the space 102 and, as a result, be presented with corresponding AR experiences (visualizations) displayed on a screen of a0020

In FIG. 1, multiple physical locations 104A-105C have been schematically indicated in the space 102. A user of the system 100 can navigate, via the AR environment, to some or all of the physical locations 104A-104C in the space 102. AR objects, via the AR environment, can be placed by the user at the physical locations 104A-104C, or can be placed at one physical location in the space 102 and then moved (moved, manipulated, interacted with, etc.) in the AR environment to one or more other physical locations in the space 102. In some implementations, the physical locations 104A-C can correspond to the physical objects in the space 102, such as a table, a chair, etc.

One or more devices can be used to create the AR experience. Here, a device 106 is schematically shown in the space 102. Any kind of device can be used, including, but not limited to, a smartphone or a tablet device. For example, any device similar to those described below with reference to FIG. 10 can be used. In some implementations, the approaches for provide an immersive AR experience described herein can be implemented in conjunction with other functionality of the device 106, such as a camera application, a game that is executed on the device 106, a dedicated AR application, as some examples.

In the example of FIG. 1, the device 106 includes an AR system 108. The AR system 108 can use any form of AR technology to sense the position of the device 106 in the space 102. In some implementations, markers in the space 102 can form a basis for the organization within the AR environment. For example, the AR system 108 can use light sensing (e.g., infrared light) and two or more lenses to generate a stereo vision in the space 102 in order to develop a stereoscopic understanding thereof that allows the AR system 108 to also extrapolate into positions of the space 102 to which there is currently no line-of-sight. In some implementations, the AR system 108 is executed partially on the device 106 and partially on one or more other devices (e.g., another handheld device or a cloud system).

The device 106 can include one or more display screens 110. In some implementations, the display screen can be a touchscreen. For example, a user can interact with the display screen 110 to place, manipulate and interact with AR objects in the AR environment, e.g., using the AT system 108, where, as noted above, the AR system 108 can operate in conjunction with other functions (features, etc.) of the device 100).

The device 106 can include an orientation system 114. The orientation system can serve to determine one or more aspects of the physical presence of the device 106 within the space 102. In some implementations, the orientation system 114 can determine a physical inclination of the device 106. For example, the orientation system 114 can include an image sensor 114A (e.g., a camera and/or an infrared (IR) sensor) and can capture images of at least part of the space 102 in order to determine how the device 106 is currently oriented. As another example, the orientation system 114 can include an inertial measurement unit (IMU) 114B (e.g., an accelerometer, a gyroscope, etc.) that is used to sense how the device 106 is currently oriented. In some implementations, the orientation system 114, the image sensor 114A and/or the IMU 114B can be a native component in the device 106, such as a camera and/or an IMU of a smartphone or tablet device. In some implementations, the orientation system 114 can operate in conjunction with the AR system 108 to allow a user to navigate the space 102 within the AR environment.

An AR environment 116 is schematically illustrated in FIG. 1. The AR environment 116 can be a virtual construct and can be stored in a memory, such as on the device 106. One or more aspects of the AR environment 116 can be presented on the display screen 110 of the device 106. For example, the user may only be presented with a part of the AR environment 116 at any given time. The presented aspect of the AR environment 116 can include imagery of a portion of physical reality (e.g., an image of the space 102 within a view of a camera of the device 106) and imagery of one or more virtual objects, such as AR object placed in the AR environment 116 by the user. Appearance of the AR environment 116 (e.g., at a particular time) can depend on where in the space 102 the device 106 is currently located and/or on how the device 106 is oriented. This relationship between the AR environment 116 and the space 102 is schematically represented in FIG. 1 by an arrow 118.

In the example of FIG. 1, AR objects 120A-120C are shown. For example, the AR objects 120A-120C can be placed, e.g., by the user, at various location in the AR environment 116 corresponding with physical locations in the space 102. For purposes of illustration, the AR objects 120A-120C are illustrated in correspondence, respectively, with the locations 104A-104C. In some implementations, the AR objects 120A-120C can be placed at, and/or manipulated to, other locations in the AR environment 116 than those shown in FIG. 1. Also, as is illustrated by the dashed arrows in FIG. 1, the user can, with AR environment 116, move between the locations of the object 120A-120. The path shown in FIG. 1 is illustrative and different paths and/or locations can be viewed by the user, and can include AR objects in those locations (e.g., AR objects placed by the user at, and/or manipulated by the user to, those locations).

Figure 2:
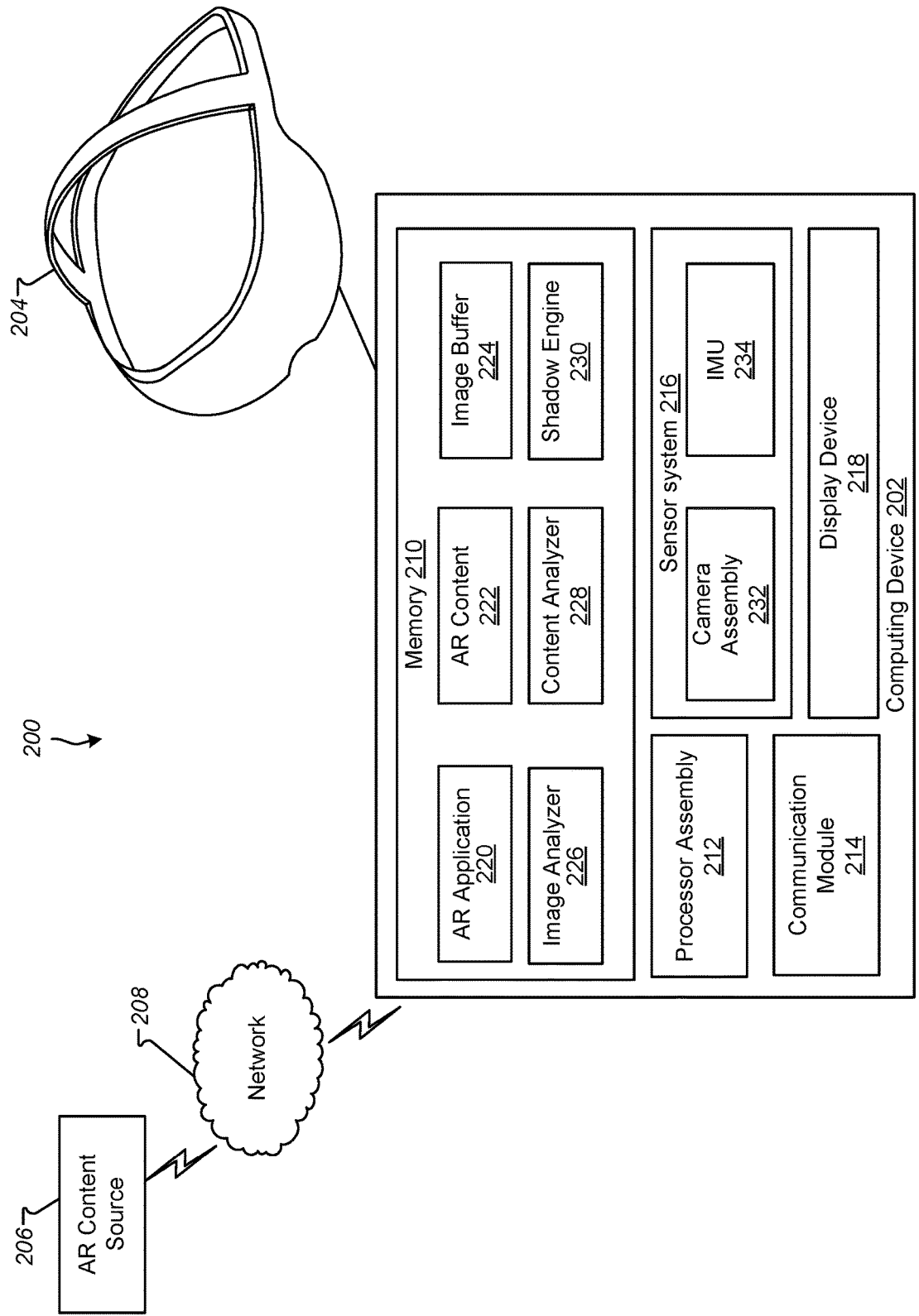
FIG. 2 is a block diagram illustrating a system according to an example implementation.

FIG. 2 is a block diagram illustrating another system 200 according to an example implementation. As with the system 100, the system 200 can generate an augmented reality (AR) environment for a user of the system 200. In some implementations, the system 200 includes a computing device 202, a head-mounted display device (HMD) 204 or other display device (such as a display of the computing device 202), and an AR content source 206. Also shown is a network 208 over which the computing device 202 may communicate with the AR content source 206.

The computing device 202 may include a memory 210, a processor assembly 212, a communication module 214, a sensor system 216, and a display device 218. The memory 210 may include an AR application 220, AR content 222, an image buffer 224, an image analyzer 226, a content analyzer 228, and a shadow engine 230. The computing device 202 may also include various user input components (not shown) such as a controller that communicates with the computing device 202 using a wireless communications protocol. In some implementations, the computing device 202 is a mobile device (e.g., a smart phone) which may be configured to provide or output AR content to a user via the HMD 204 and/or the display device 218. For example, in some implementations, the computing device 202 and the HMD 204 (or other display device) may communicate via a wired connection (e.g., a Universal Serial Bus (USB) cable) or via a wireless communication protocol (e.g., any WiFi protocol, any BlueTooth protocol, Zigbee, etc.). In some implementations, the computing device 202 can be a component of the HMD 204 and may be contained within a housing of the HMD 204.

The memory 210 can include one or more non-transitory computer-readable storage media. The memory 210 may store instructions and data that are usable to generate an AR environment for a user.

The processor assembly 212 includes one or more devices that are capable of executing instructions, such as instructions stored by the memory 210, to perform various tasks associated with generating an AR environment. For example, the processor assembly 212 may include a central processing unit (CPU) and/or a graphics processor unit (GPU). For example, if a GPU is present, some image/video rendering tasks, such as displaying AR objects, displaying aspects of elevating AR objects (such as displaying tether lines), generating shadows or shading polygons representing shadows of AR objects, etc., may be offloaded from the CPU to the GPU.

The communication module 214 includes one or more devices for communicating with other computing devices, such as the AR content source 206. The communication module 114 may communicate via wireless or wired networks, such as the network 208.

The sensor system 216 may include various sensors, such as a camera assembly 232. Implementations of the sensor system 216 may also include other sensors, including, for example, an inertial motion unit (IMU) 234, a light sensor, an audio sensor, an image sensor, a distance and/or proximity sensor, a contact sensor such as a capacitive sensor, a timer, and/or other sensors and/or different combination(s) of sensors.

The IMU 234 detects motion, movement, and/or acceleration of the computing device 202 and/or the HMD 204. The IMU 234 may include various different types of sensors such as, for example, an accelerometer, a gyroscope, a magnetometer, and other such sensors. A position and orientation of the HMD 204 may be detected and tracked based on data provided by the sensors included in the IMU 234. The detected position and orientation of the HMD 204 may allow the system to detect and track the user's gaze direction and head movement, or movement of the computing device 202.

In some implementations, the AR application 220 may use the sensor system 216 to determine a location and orientation of a user within a physical space and/or to recognize features or objects within the physical space.

The camera assembly 232 captures images and/or videos of the physical space around the computing device 202. The camera assembly 232 may include one or more cameras. The camera assembly 232 may also include an infrared camera.

The AR application 220 may present or provide the AR content to a user via the HMD and/or one or more output devices of the computing device 202 such as the display device 218, speakers, and/or other output devices. In some implementations, the AR application 220 includes instructions stored in the memory 210 that, when executed by the processor assembly 212, cause the processor assembly 212 to perform the operations described herein. For example, the AR application 220 may generate and present an AR environment to the user based on, for example, AR content, such as the AR content 222 and/or AR content received from the AR content source 206. The AR content 222 may include content such as images or videos that may be displayed on a portion of the user's field of view in the HMD 204. The AR environment may also include at least a portion of the physical (real-world) environment and physical (real-world) entities. For example, shadows may be generated so that the content better fits the physical space in which the user is located. The content may include objects that overlay various portions of the physical space. The content may be rendered as flat images or as three-dimensional (3D) objects. The 3D objects may include one or more objects represented as polygonal meshes. The polygonal meshes may be associated with various surface textures, such as colors and images.

The AR application 220 may use the image buffer 224, image analyzer 226, content analyzer 228, and shadow engine 230 to generate images for display via the HMD 204 based on the AR content 222. For example, one or more images captured by the camera assembly 232 may be stored in the image buffer 224. In some implementations, the image buffer 224 is a region of the memory 210 that is configured to store one or more images. In some implementations, the computing device 202 stores images captured by the camera assembly 232 as a texture within the image buffer 224. Alternatively or additionally, the image buffer may also include a memory location that is integral with the processor assembly 212, such as dedicated random access memory (RAM) on a GPU.

The image analyzer 226 may determine various properties of the image, such as the location of a surface plane, or surface planes upon which the content may be positioned. Such surface planes can be referred herein as reference surfaces. In some implementations, a given surface plane (reference surface) can be a substantially horizontal plane that corresponds to the ground, a floor, a desk, a table, or another surface upon which objects, such as the content to be inserted, could be placed.

The AR application 220 may determine a location to insert AR content, such as an AR object (a sticker, a character, a sprite, etc.). For example, the AR application may prompt a user to identify a location for inserting the content and may then receive a user input indicating a location on the screen for the content. In some implementations, the user may indicate a location for placing AR content with being prompted. The AR application 220 may determine the location of the inserted content based on that user input. For example, the location for the content to be inserted may be the location indicated by the user. In some implementations, the location is determined by mapping the location indicated by the user to a plane corresponding to a surface such as a tabletop, a desktop, a floor or the ground in the image (e.g., by finding a location on a plane identified by the image analyzer 226 that is below the location indicated by the user). The location may also be determined based on a location that was determined for the content in a previous image captured by the camera assembly (e.g., the AR application may cause the content to move across a surface that is identified within the physical space captured in the image).

The content analyzer 228 may then determine various properties of the content to be inserted at the determined location. For example, the content may be associated with a 3D model and skeletal animation model that includes joints. The skeletal animation model may be disposed within the 3D model and may allow for movement of portions of the 3D model around some or all of the joints. As an example, the content analyzer 228 may determine a bounding box and shadow center point on the surface plane based on the location of at least some of the joints of the skeletal animation model. For example, the skeletal joints may be projected onto the surface plane. In at least some embodiments, the joints are projected from an overhead position so as to generate shadows that appear to come from an overhead light source (e.g., by discarding the height component (i.e., the Y component when the surface is parallel to the X-Z plane) of the 3D position of the joints or setting the height component equal to the height of the plane). In some implementations, all of the joints are used to generate the bounding box and identify the shadow center point. In some implementations, a subset of the joints are used to generate the bounding box and identify the shadow center point (e.g., the inserted content may identify joints to use or exclude). In some implementations, the shadow center point may not be at a center of an object.

The bounding box may be a rectangle on the surface that contains all of the projected joints. In at least some implementations, the rectangle is aligned with the axes of the 3D coordinate system (e.g., if the surface is parallel to the X-Z plane, the sides of the rectangle are aligned with either the X or Z axes).

The shadow center point can be determined in various ways. For example, the shadow center point can be the spatial midpoint of the projected joints. The shadow center point can also be calculated as a center of mass of the projected joints (i.e., the average position of the projected joints). In some implementations, the joints may be assigned weights for purposes of calculating the center of mass. For example, the weights can be assigned based on distance from the surface (e.g., the joints that are closer to the surface have a higher weight than those that are further away). In some implementations, all joints that are not blacklisted are inversely weighted based on distance from the surface.

The shadow engine 230 may generate one or more shadows for the inserted AR content (object). In some implementations, the shadow engine 230 generates a shadow polygon based on the bounding box and shadow center point determined by the content analyzer 228. The shadow polygon may have a dark color (e.g., black) and a transparency value that varies based on distance from the shadow center point. In some implementations, the transparency value is determined by applying a non-linear falloff based on distance from the center point. The non-linear falloff may cause the pixels near the center of the polygon to have a low transparency value and the pixels near the edges of the polygon to have a higher transparency value. In at least some implementations, the pixels on the edge of the polygon are completely transparent.

In some implementations, the shadow engine 230 may also use other techniques to generate shadows. For example, the shadow engine 230 may use shadow maps to generate shadows. The shadows generated by the shadow maps may be combined with the shadows generated using the bounding box and shadow center point. In some implementations, the shadows generated using these two techniques (or even additional techniques) are combined by weighting the shadows generated using these two techniques based on distance to the inserted content. For example, the shadows generated using shadow maps may be weighted more heavily when the inserted content is closer to the camera assembly 232. Additionally, other techniques to generate shadows may be used too and combined (or weighted) in a similar manner. For example, additional shadows may be generated based on individual joints in the skeleton. These additional shadows may be given greater weight when the inserted content is further away from the camera assembly 232 (e.g., to substitute for the shadows generated using shadow maps). In some implementations, a size of a shadow for an AR object can be altered (e.g., reduced or increased) in response to a user manipulating the AR object to change a distance the AR object is elevated off a given reference surface on which a shadow is displayed.

In some implementations, the image analyzer 226, content analyzer 228, and shadow engine 230 may include instructions stored in the memory 210 that, when executed by the processor assembly 212, cause the processor assembly 212 to perform operations described herein to generate an image or series images that are displayed to the user (e.g., via the HMD 204).

The AR application 220 may update the AR environment based on input received from the camera assembly 232, the IMU 234, and/or other components of the sensor system 216. For example, the IMU 234 may detect motion, movement, and/or acceleration of the computing device 202 and/or the HMD 204. The IMU 234 may include various different types of sensors such as, for example, an accelerometer, a gyroscope, a magnetometer, and other such sensors. A position and orientation of the HMD 204 may be detected and tracked based on data provided by the sensors included in the IMU 234. The detected position and orientation of the HMD 204 may allow the system to detect and track the user's position and orientation within a physical space. Based on the detected position and orientation, the AR application 220 may update the AR environment to reflect a changed orientation and/or position of the user within the environment.

Although the computing device 202 and the HMD 204 are shown as separate devices in FIG. 2, in some implementations, the computing device 202 may include the HMD 204. In some implementations, the computing device 202 communicates with the HMD 204 via a cable, as shown in FIG. 2. For example, the computing device 202 may transmit video signals and/or audio signals to the HMD 204 for display for the user, and the HMD 204 may transmit motion, position, and/or orientation information to the computing device 202.

The AR content source 206 may generate and output AR content, which may be distributed or sent to one or more computing devices, such as the computing device 202, via the network 208. In an example implementation, the AR content includes three-dimensional scenes and/or images. Additionally, the AR content may include audio/video signals that are streamed or distributed to one or more computing devices. The AR content may also include an AR application that runs on the computing device 202 to generate 3D scenes, audio signals, and/or video signals.

The network 208 may be the Internet, a local area network (LAN), a wireless local area network (WLAN), and/or any other network. A computing device 202, for example, may receive the audio/video signals, which may be provided as part of AR content in an illustrative example implementation, via the network.

Figure 3:
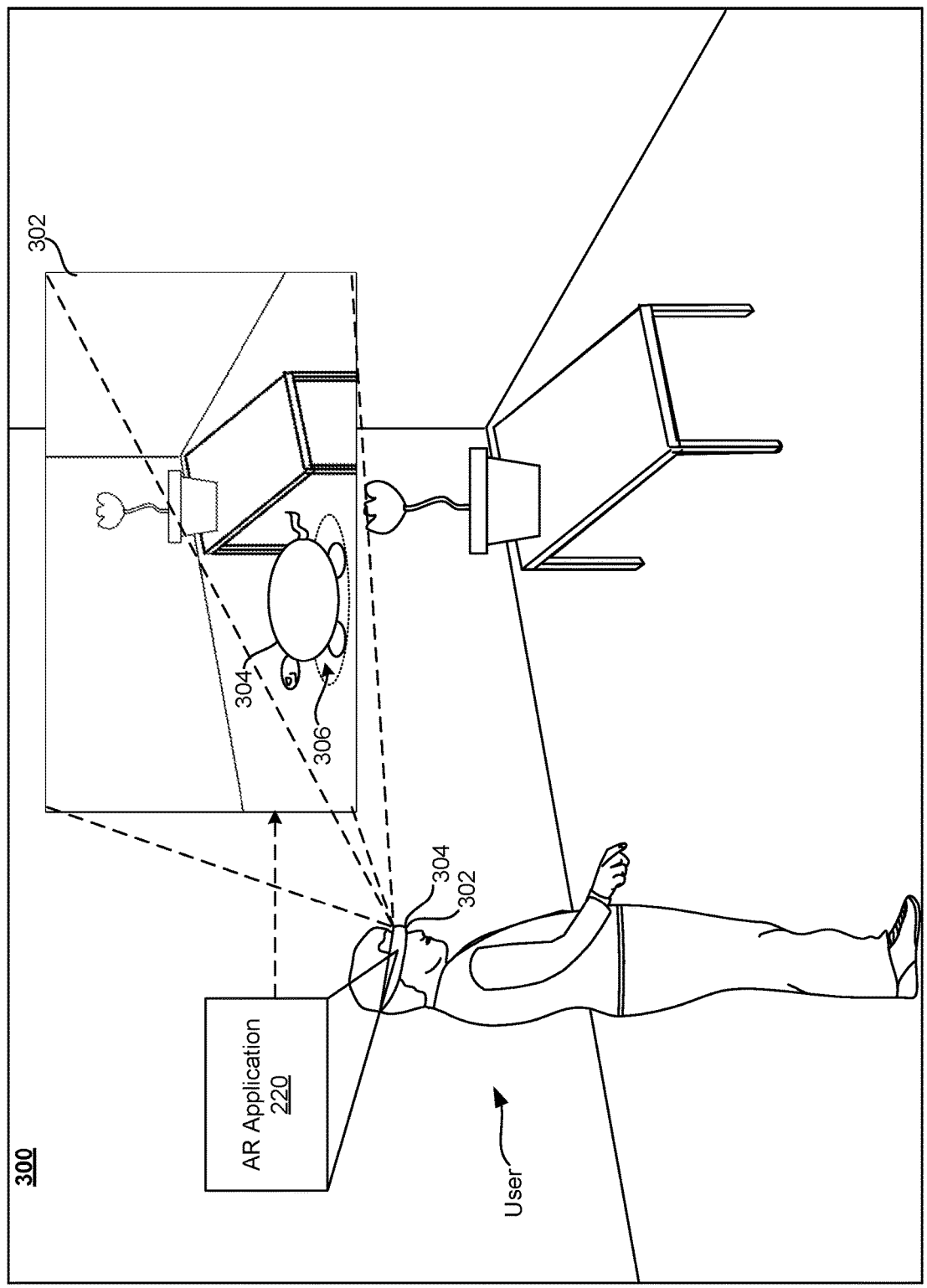
FIG. 3 is a third person view of an example physical space, in which a user is experiencing an AR environment through the example HMD of FIG. 1.

FIG. 3 is a third person view of an example physical space 300, in which a user is experiencing an AR environment 302 through the example HMD 204. The AR environment 302 can be generated by the AR application 220 of the computing device 202 and displayed to the user through the HMD 204, or other device.

The AR environment 302 includes inserted content 304 that is displayed over an image of the physical space 300. In this example, the content 304 is a turtle that is generating a shadow 306 on the representation of the floor in the AR environment 302. The shadow is generated in accordance with the techniques described herein.

In some implementations, the AR environment 302 is provided to the user as a single image or a pair of stereoscopic images that occupy all or substantially all of the user's field of view and are displayed to the user via the HMD 204. In other implementations, the AR environment is provided to the user by displaying/projecting the inserted content 304 and the generated shadow 306 on an at least partly transparent combiner that occupies at least a portion of the user's field of view. For example, portions of the HMD 204 may be transparent, and the user may be able to see the physical space 300 through those portions while the HMD 204 is being worn.

Figure 4:
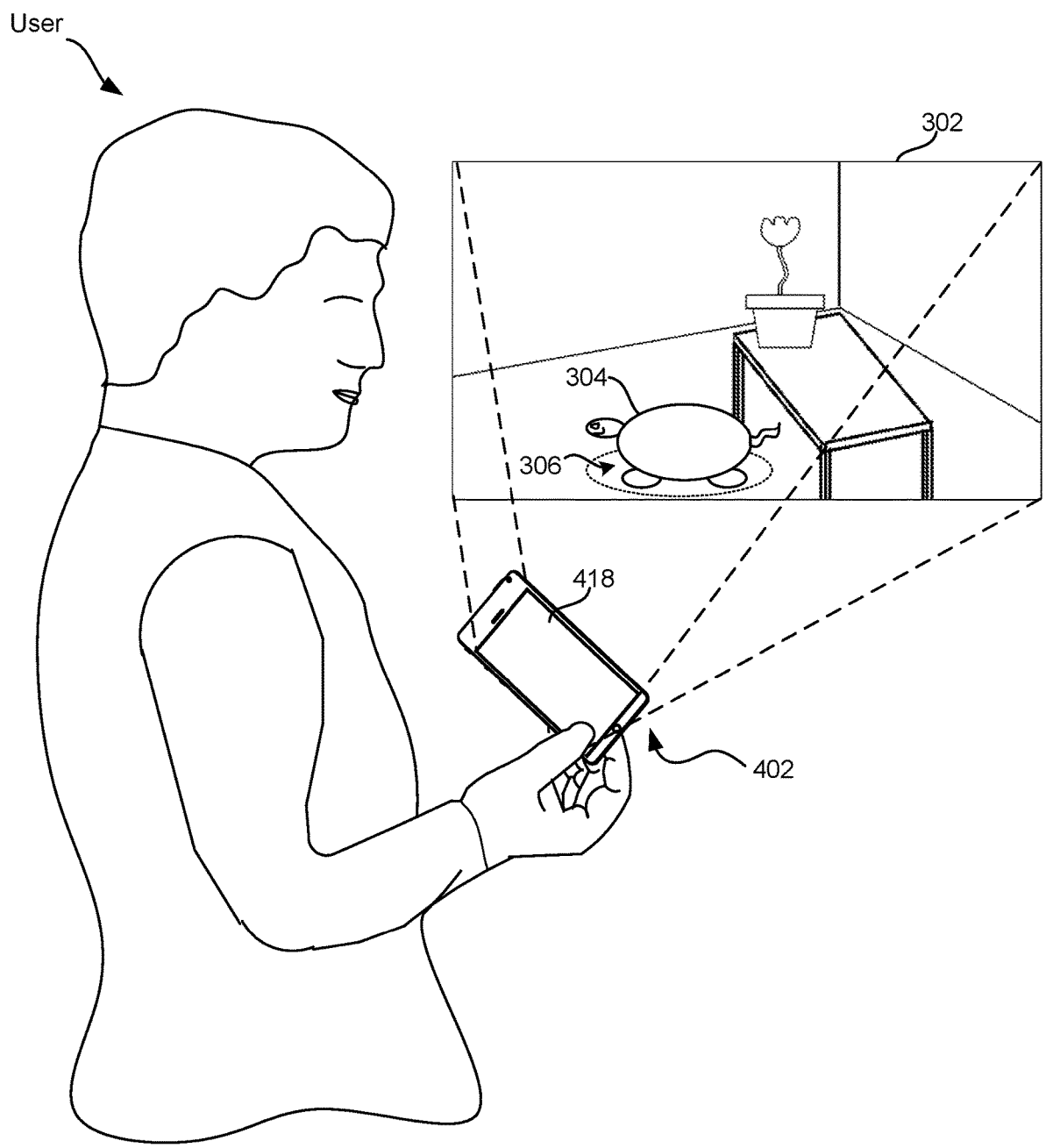
FIG. 4 is a schematic view of a user experiencing the AR environment via an example portable electronic device.

FIG. 4 is a schematic view of a user experiencing the AR environment 302 via an example portable electronic device 402. The portable electronic device 402 is an example of the computing device 202. The portable electronic device 402 may be a smartphone, a tablet, or another type of portable computing device. In this example, the user is experiencing the AR environment 302 through a display device 418 of the portable electronic device. For example, the display device 418 may include a screen that can show images and/or videos, as well as receive input from a user for placement and manipulation (movement, elevation, etc.) of AR objects in the AR environment 302 (or other AR environment).

Figure 5:
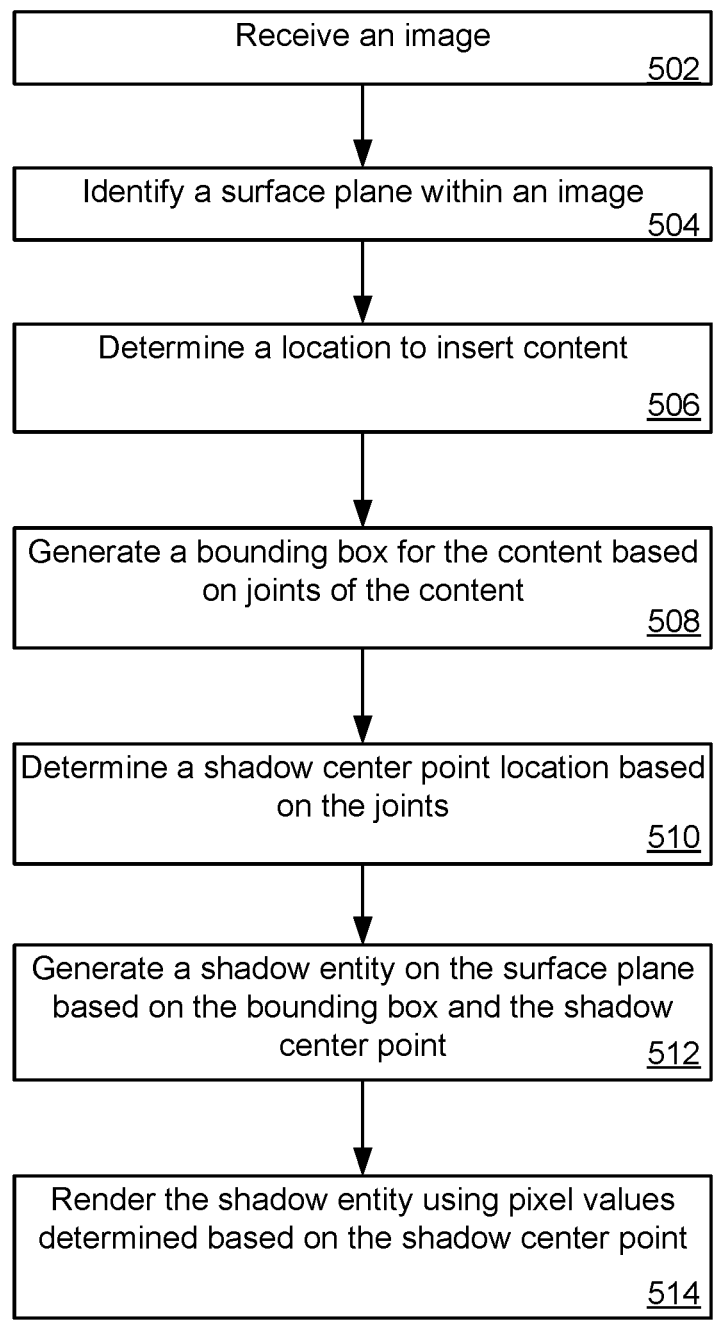
FIG. 5 is a diagram of an example method of generating shadows for inserted content, in accordance with implementations described herein.

FIG. 5 is a diagram of an example method 500 of generating shadows for inserted content, in accordance with implementations described herein. This method 500 may for example be performed by the computing device 202 to provide an AR environment for a user.

At operation 502, an image is received. Receiving the image may include capturing the image with a camera assembly, such as the camera assembly 232. Receiving the image may include accessing a previously captured image that is stored in a memory location. An image may also be received from another computing device, such as a server that is accessible via a network.

At operation 504, a surface plane, which can be referred to as a reference surface, is identified within the image. The surface plane may be identified using various image processing techniques. For example, the surface plane may be identified by identifying a substantially planar region of the image. In some implementations, the surface plane may be generated based on analyzing multiple images (e.g., a sequence of images from a video stream of the physical space). The surface plane may correspond to the ground, a floor, a tabletop, a desktop, or another surface upon which objects may be placed (e.g., a table, counter, shelf). In some implementations, multiple surface planes, or reference surfaces can be identified in an AR environment.

At operation 506, a location of content to be inserted is determined. In some implementations, the content to be inserted is AR content, such as an AR object. In at least some implementations, the inserted content can include one or more three-dimensional models, such as polygonal meshes. The polygonal mesh may be associated with a skeletal animation model that includes a plurality of joints that are connected to one another. The skeletal animation model may allow for movement or rotation around at least some of the joints. These movements may cause corresponding movements or deformations of portions of the polygonal mesh.

The location of the content to be inserted may, for example, be determined by identifying substantially planar surfaces in the received image and positioning the content on an identified surface. The location of the content to be inserted may also be determined at least in part by user input. For example, the user may identify a location within an image to insert content. In some implementations, the content may be placed at a location on a horizontal plane that corresponds to the location identified by the user (e.g., a location below the position identified by the user so the content is positioned on the plane). The location of the content may also be determined based on the location of the content in a previous image (i.e., a previous frame of a video captured by the camera assembly). For example, the content may move around relative to the physical space (e.g., the computer-generated turtle image content shown in FIG. 3 may crawl across the floor, or may be manipulated by the user to move around the AR environment).

At operation 508, a bounding box is generated for the content based on the joints. The joints may be projected from above onto the surface plane identified in operation 504. In some implementations, the vertical component of the 3D positions of the joints may be ignored to compute the bounding box. In some implementations, the bounding box is a quadrilateral that bounds (surrounds) the joints. The bounding box may be, for example, a rectangle. In some implementations, a subset of the joints is used to determine the bounding box. For example, the inserted content may be associated with a data structure that identifies some of the joints to use or exclude from using to generate the bounding box.

At operation 510, a shadow center point location is determined based on the joints. For example, shadow center point location is determined based on the positions of the joints projected onto the surface plane. In some implementations, the shadow center point is a spatial midpoint of the joints. In some implementations, the shadow center point is calculated as a center of mass of the points. For example, the joints may be weighted equally and the location of the center point is determined by averaging the position of the joints. In some implementations, the joints are weighted based on distance from the surface plane (e.g., height) and the location of the center point is determined as a weighted average of the positions of the joints. Similar to generating the bounding box (described above at least with respect to operation 508), in some implementations, a subset of the joints may be used to determine the shadow center point location.

At operation 512, a shadow entity is generated on the surface plane based on the bounding box and the shadow center point. For example, the shadow entity may be a polygon that is circumscribed by the bounding box. In at least some implementations, the shadow entity is an oval-shaped polygon that has a first axis and a second axis that intersect at the shadow center point. The oval-shaped polygon may have zero, one, or two axes of symmetry. In some implementations, polygons having other shapes may be used, such as rectangular polygons. Additionally, in some implementations, an oval-shaped polygon is generally represented using multiple straight lines that are arranged to approximate an oval.

At operation 514, the shadow entity is rendered using pixel values determined based on the shadow center point. In some implementations, pixels of the shadow entity are rendered with a dark color, such as black, and have a varying transparency (e.g., alpha value). The transparency value for a pixel may be determined based on the distance between the pixel and the center point. In some implementations, the transparency value is also based on the distance from the pixel value to the edge of the polygon. For example, the transparency value may be determined using a radial fall off function based on the pixel's location represented as a percentage of the distance from the shadow center point to the edge of the polygon. In some implementations, a pixel that is on the edge of the polygon (100%) will be completely transparent and a pixel that is at the shadow center point (0%) will be completely opaque. In some implementations, the radial fall off is linear. In other implementations, the radial fall off is non-linear. For example, for pixels that are less than 50% of the way to the polygon edge, the transparency value may be low such that the shadow entity is substantially opaque; while pixels that are more than 50% of the way to the polygon edge rapidly increase in transparency. In some implementations, a pixel value can include a color of a pixel.

Once the shadow entity is rendered, the inserted content can be added in front of the shadow and then both the shadow entity and the inserted content can be overlaid on the image received at operation 502 to generate an augmented image. The augmented image may then be displayed to the user to provide an augmented environment. Additionally, the rendered shadow entity and the inserted content may be projected onto a transparent combiner surface where they will be shown over a user's field of view of the physical space. Although this example describes adding inserted content in front of the rendered shadow entity, in some implementations the inserted content and the shadow entity are rendered together and only the portions of the shadow entity that would be visible are actually rendered.

Figure 6:
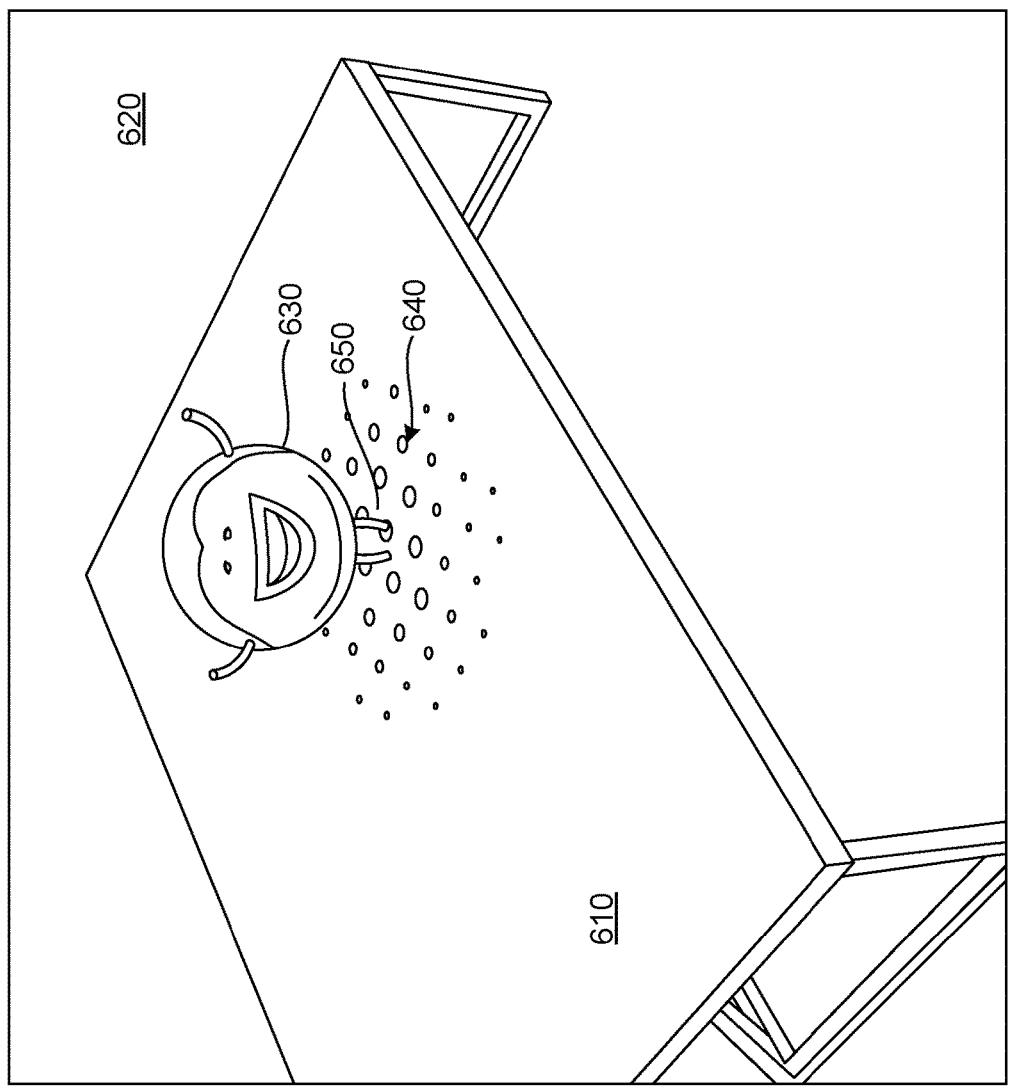
FIG. 6 is a diagram illustrating placement of an AR object in an AR environment.

FIG. 6 is a diagram illustrating placement of an AR object in an AR environment. In FIG. 6, an AR environment 600 is illustrated. The AR environment 600 includes multiple reference surfaces 610 (a tabletop), and 620 (a floor). In some implementations, the reference surfaces can correspond with physical objects in a physical space that is visually displayed in the AR environment 600. As noted above, a user can provide an indication (e.g., using a touchscreen of an electronic device) that an AR object 630 (e.g., an animated donut) is to be placed on the reference surface 610 (the table), though the user could also choose to place the AR object 630 on the reference surface 620 (the floor). In some implementations, the AR object 630 could be selected (by the user) from a plurality of AR objects (e.g., that can be included in the AR content source 206 and/or the AR content 222 in FIG. 2, as an example). For instance, the AR object 630 could be selected from a palette of available AR objects that are presented to the user (e.g., within a camera application an electronic device being used to display the AR environment 600).

As shown in FIG. 6, after placement of the AR object 630 on the reference surface 610, a pattern 640 can be displayed under the AR object 630. In some implementations, the pattern 640 can be used to indicate to a user that placement of the AR object is completed. In some implementations, the pattern 640 may not be displayed during a process of placing the AR object 630 (e.g., when a user is dragging an AR object from a palette to a desired placement location in the AR environment 600). As is further shown in FIG. 6, a shadow 650 corresponding with AR object 630 can be displayed, e.g., on the reference surface 610 in the AR environment 600. The shadow 650 can be displayed (rendered, etc.) using the approaches described herein.

After placement, a user can manipulate the AR object 630 in the AR environment, which can include moving the AR object 630 from one location in the AR environment 600 to another location in the AR environment 600, and/or elevating the AR object 630 above a reference surface on which it has been placed (e.g., reference surface 610 in this example). In some implementations, when the AR object 630 is manipulated by a user, the pattern 640 and the shadow 650 can be rendered so as to virtually correspond with the manipulation of the AR object 630. For example, if the AR object 630 is moved, the pattern 640 and/or the shadow 650 can, in the AR environment 600, move in correspondence with the movement of the AR object 630. If the user changes an elevation of the AR object 630 above a reference surface, such as the reference surface 610, the size of the shadow 650 can be altered (e.g., increased or decreased) in correspondence with the change (e.g., down or up) in elevation of the AR object 630 above a given reference surface.

Figure 7A:
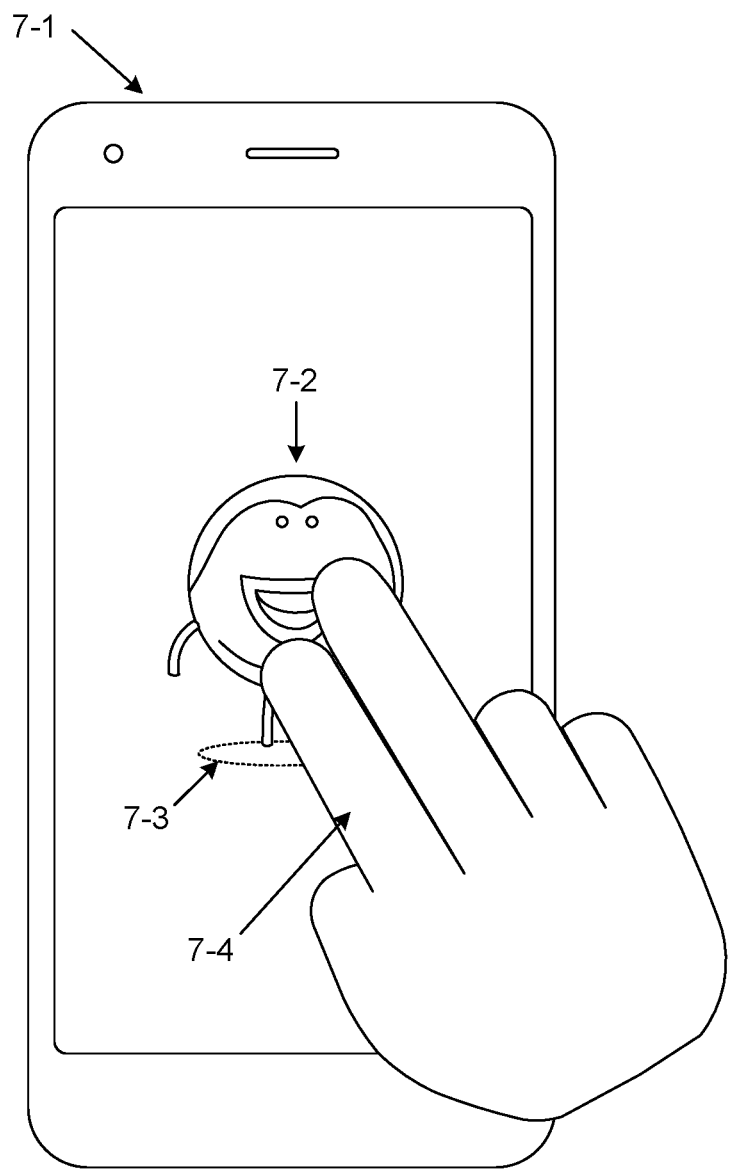
FIGS. 7A-7C are diagrams illustrating a sequence for elevating an AR object from a reference surface in an AR environment.
Figure 7B:
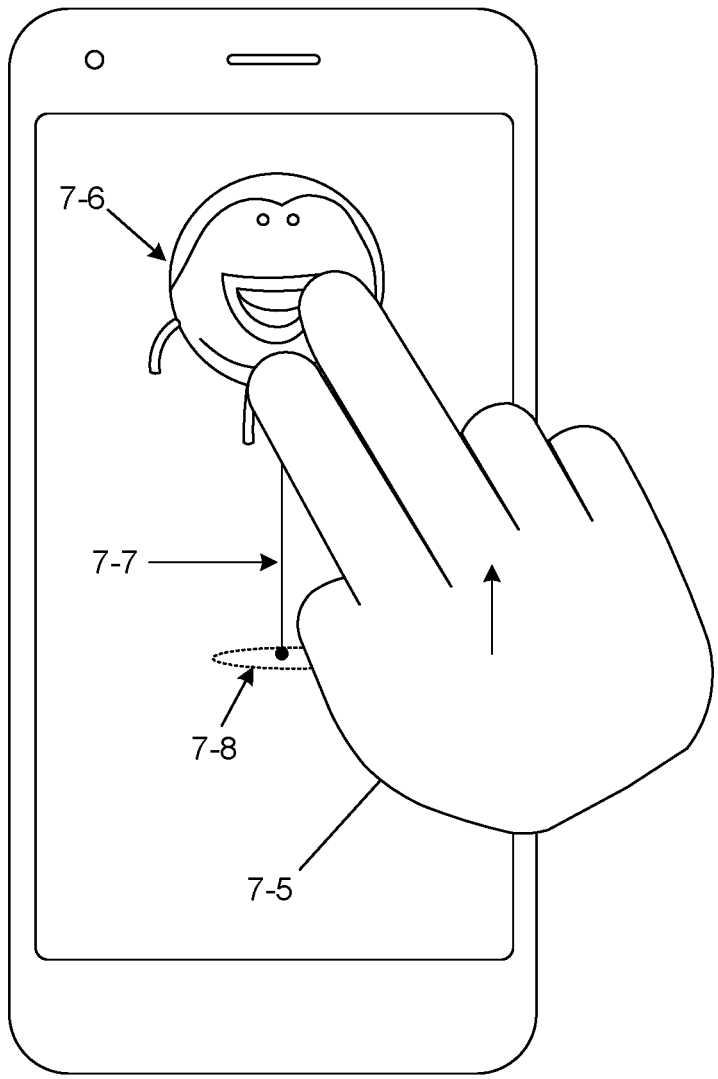
Figure 7C:
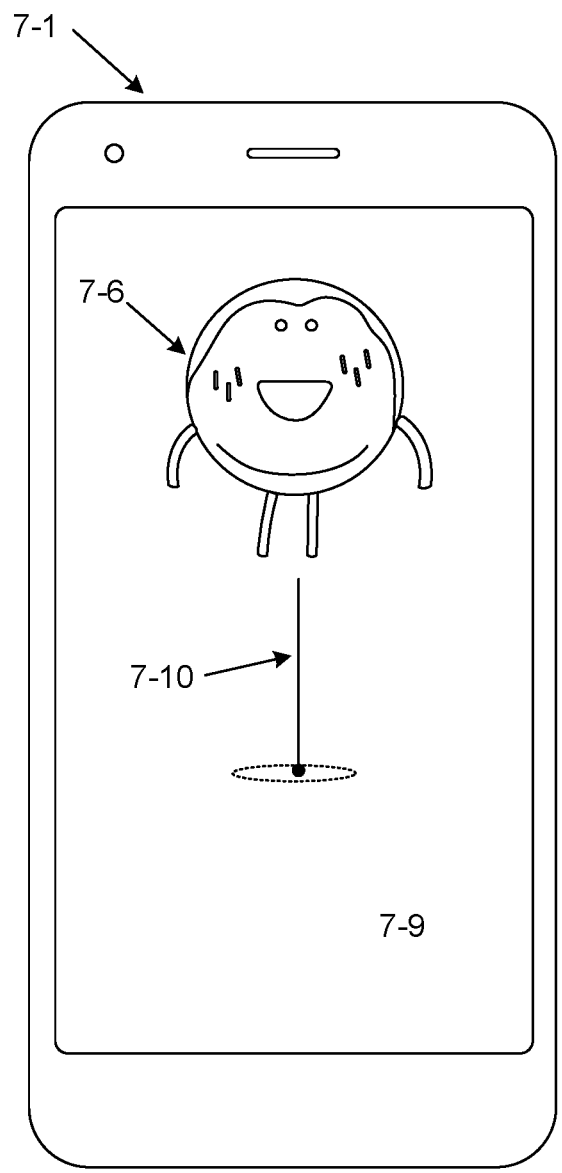

FIGS. 7A-7C are diagrams illustrating a sequence for elevating an AR object from a reference surface in an AR environment. A brief description of each of the elements and/or aspects of FIGS. 7A-7C is also included in respective figures. For instance, in FIGS. 7A-7C, an AR environment can be displayed on a mobile electronic device 7-1. In some implementations, the mobile electronic device 7-1 can be a smartphone device and the AR environment can be implemented (displayed) as part of camera application of the mobile electronic device 7-1. As shown, in FIG. 7A, a virtual character (AR object) 7-2 can be placed in the AR environment, such as using the approaches described herein. In this example implementation, a virtual character shadow 7-3 can be shown on a reference surface (not shown in FIG. 7A) on which the virtual character 7-2 was placed (e.g., by a user). While not shown in FIGS. 7A-7C, a pattern, such as the pattern 640 of FIG. 6 could also be shown after placement of the virtual character in the sequence of FIGS. 7A-7C.

As illustrated in FIG. 7A (by reference character 7-4) a user can initiate a gesture (e.g., a two-finger slide gesture) that can be used to change an elevation of the virtual character above the reference surface on which it was placed in the AR environment. For instance, the user can place the tips of two fingers on the virtual character on touchscreen display of the mobile electronic device 7-1.

The sequence can continue as illustrated in FIG. 7B, where, as indicated by reference character 7-5, the user can slide the two fingertips placed on the virtual character (in FIG. 7A) upward on the display screen of the mobile device 7-1. In response to the gesture (e.g., the two-finger gesture in this example), as shown at reference character 7-6, the virtual character raises up from the reference surface on which it was originally placed. In other words, the gesture illustrated by FIGS. 7A and 7B causes the virtual character to be elevated above the reference surface on which it was placed (e.g., the reference surface 610 of FIG. 6). As shown at reference character 7-7 in FIG. 7B, a tether line can be displayed between the reference surface and the virtual character, as an elevation visual affordance, indicating a point of origin on the reference surface (e.g., where the virtual character was just before being elevated) and a height, or distance that the virtual character has been elevated above the reference surface. Also, as shown at reference character 7-8 in FIG. 7B, the virtual character's shadow, after elevation, can shrink (as compared with the shadow at reference character 3 in FIG. 7A) in correspondence with the distance the virtual character has been elevated above the reference surface. In some implementations, the elevation of the virtual character above a corresponding reference surface can be reduced by using a gesture (e.g., a two-finger gesture) where the user slides down, instead of up.

As shown in FIG. 7C, the gesture to elevate the virtual character can be completed, as indicated at reference character 7-9, by the user releasing the virtual character (removing the two fingertips from the touchscreen of the mobile device). As shown in FIG. 7C, the virtual character is left floating above the reference surface it was originally placed on and elevated from, with the visual affordance of the virtual character being shown by the tether line at reference character 7-10 in FIG. 7C.

Figure 8A:
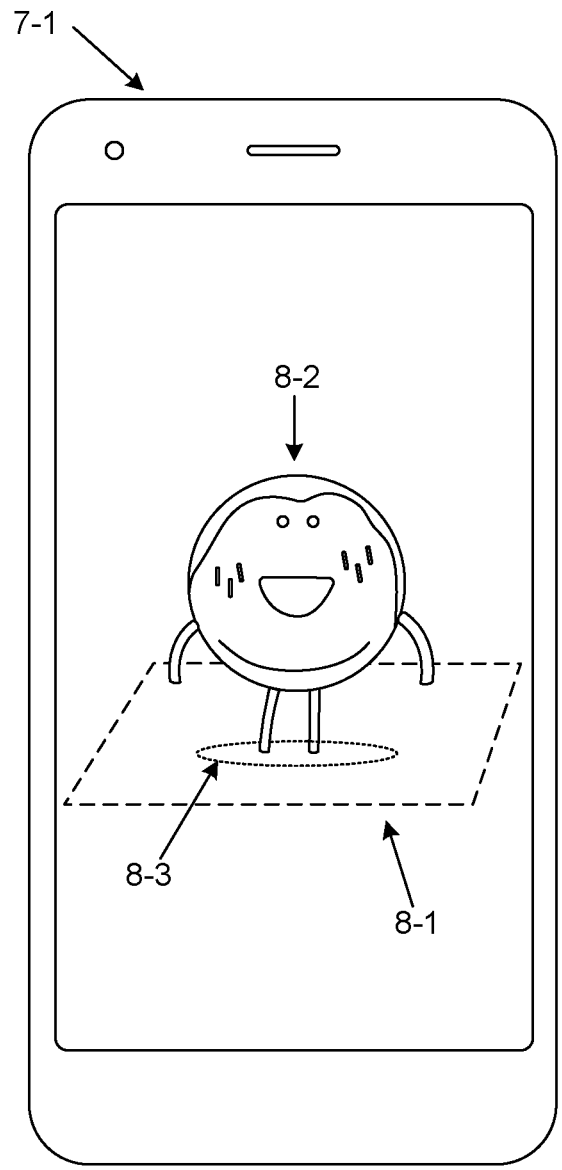
Figure 8B:
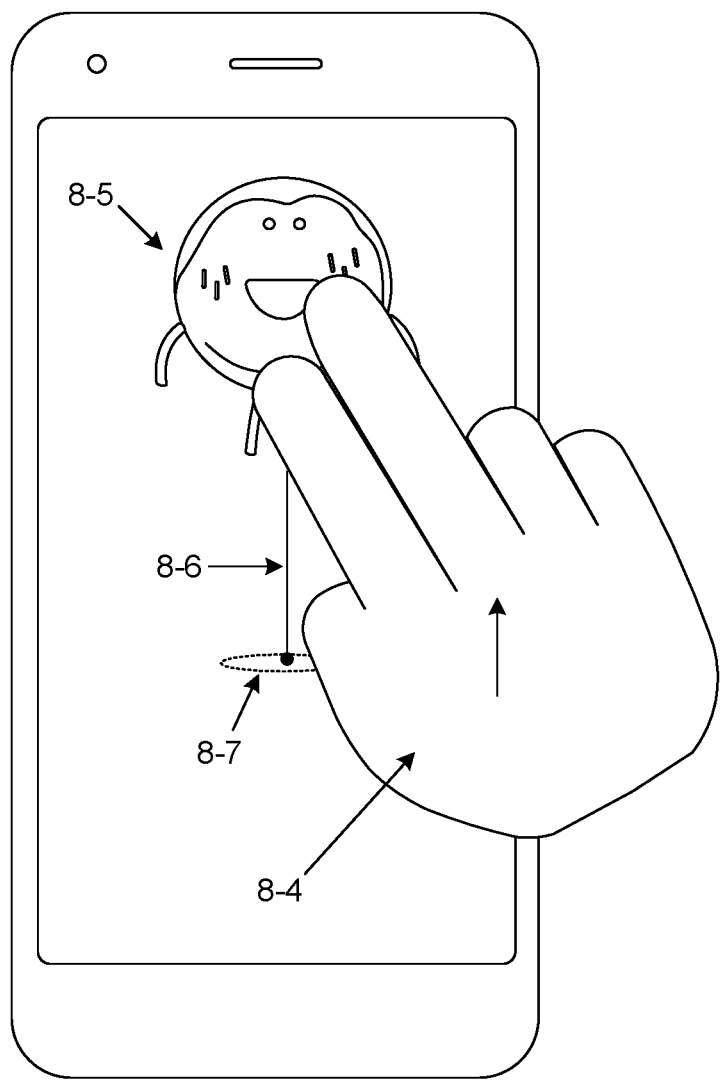

FIGS. 8A-8D are diagrams illustrating a sequence for manipulating an AR object (e.g., elevating and moving an AR object) in an AR environment. As in FIGS. 7A-7C, in FIGS. 8A-8D, an AR environment can be displayed on a mobile electronic device, or other electronic device. Also as in FIGS. 7A-7C, a brief description of each of the elements and/or aspects of FIGS. 8A-8D is also included in respective figures. FIGS. 8A and 8B illustrate, similar to FIGS. 7A and 7B, placement and elevation of an AR object (e.g., an AR, or virtual character 8-2). For instance, in FIG. 8A, the virtual character 8-2 can be placed on a first reference surface 8-1 in the AR environment, such as using the approaches described herein. In this example, the reference surface can be the reference surface 620 in FIG. 6, or a reference surface corresponding with a floor. In FIG. 8B, a shadow 8-3 of the virtual character 8-2 is shown on the reference surface 8-1 of FIG. 8A. As shown at reference characters 8-4, 8-5, 8-6 and 8-7 in FIG. 8B, a first gesture (e.g., a two-finger gesture at reference character 8-4) can be used to elevate the virtual character (at reference character 8-5) above the first reference surface, visual affordance of the elevation can be illustrated by a tether line (at reference character 8-6), and a size of the virtual character's shadow (at reference character 8-7) can be altered (reduced) in correspondence with a distance the virtual character has been elevated (virtually elevated) above the first reference surface.

Figure 8C:
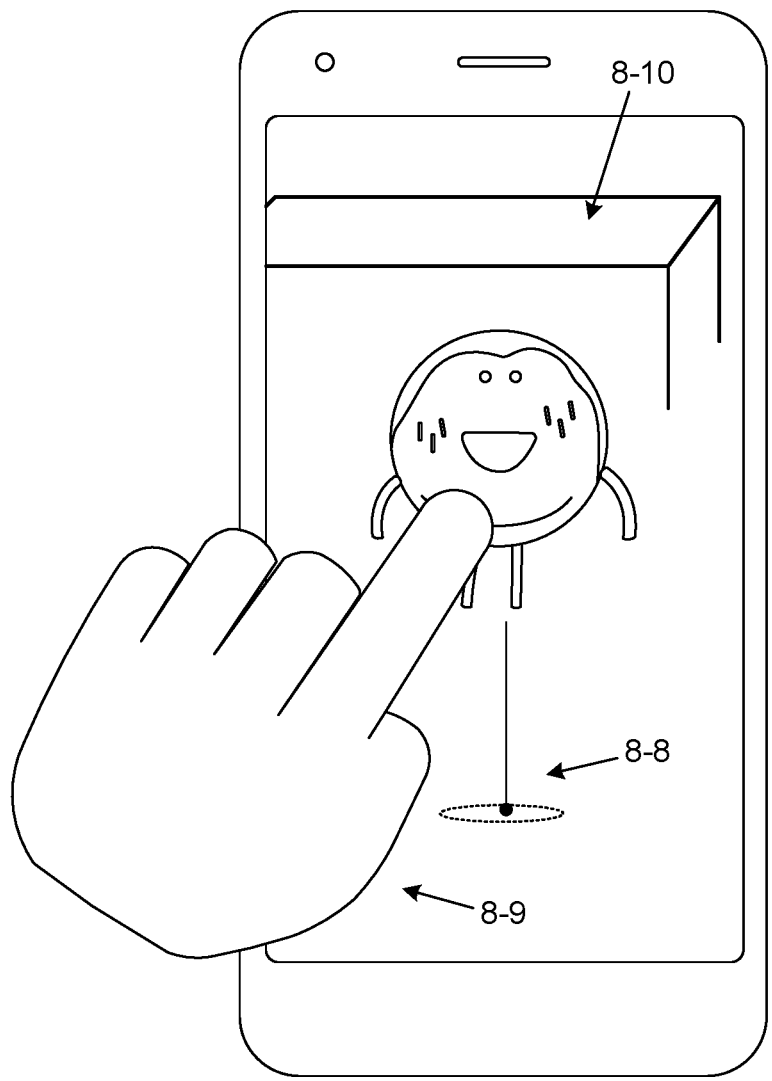

As shown in FIG. 8C, the previously elevated virtual character, as shown by a visual affordance at reference character 8-8, a second gesture (e.g., a one-finger gesture), at reference character 8-9, can be used to select and reposition (move, manipulate, etc.) the elevated virtual character by dragging the selected, elevated virtual character from being referenced from the first reference surface of FIG. 8A to being referenced from a second (elevated) reference surface 8-10, which could be the reference surface 620 of a table as shown in FIG. 6. As shown in FIG. 8D, using the second gesture, the elevated virtual character can be repositioned (e.g., moved, dragged, etc.) over the second reference surface. The elevated virtual character can then be displayed in the AR environment as being placed or elevated above the second reference surface at a same distance as the distance of the original elevation from the first reference surface, e.g., as shown in FIG. 8D, as illustrated by the visual affordance at reference character 8-12. As indicated in FIG. 8D, in this example, if the virtual character was initially elevated to a distance of 1 foot above the first reference surface, the AR character would remain at an elevation of 1 foot above the second reference surface, with any change in elevation of the AR character as a result in the change of reference surface being based on a distance (e.g., a vertical distance) between the first reference surface and the second reference surface.

The foregoing sequences are given by way of example. In some implementations, the sequences can be different. For instance, the AR character could be moved between the second reference surface and the first reference surface, or could be moved to a different location in the AR environment. In some implementation, different gestures (e.g., touchscreen gestures, or other gestures) can be used to elevate and manipulate (move) an AR (virtual) character in an AR environment. In some implementations, other AR (virtual) characters and/or additional AR characters can be placed and manipulated in an AR environment.

Figure 9:
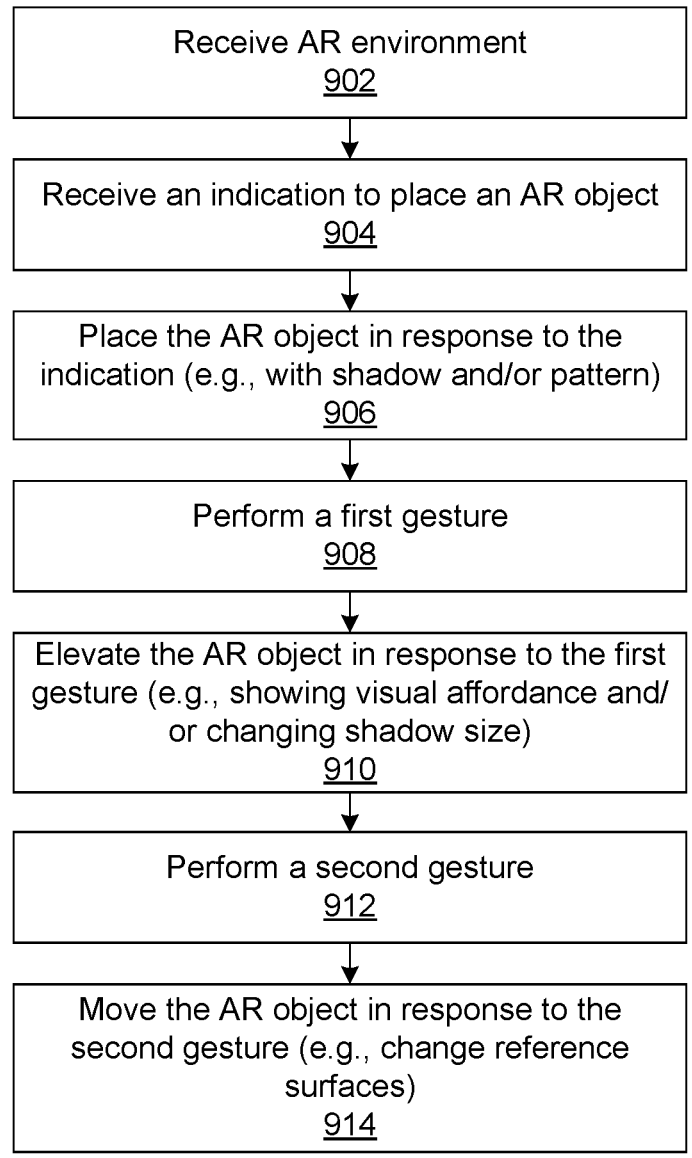
FIG. 9 is a flowchart illustrating a method for placing and manipulating an AR object in an AR environment.

FIG. 9 shows an example of a method 900. Any or all operations of a method can be performed using one or more processors executing instructions stored in a non-transitory storage medium, for example as described below. In some implementations, more or fewer operations than shown can be performed. In some implementations, two or more operations can be performed in a different order. Some components introduced elsewhere in this disclosure will be mentioned in the following description, solely for purposes of illustration.

At 902, an AR environment can be received. For example, the device 202 (FIG. 2) can receive data corresponding with the AR environment 600 (FIG. 6), such as corresponding with the reference surfaces 610 and 620. That is, in some implementations, receiving the AR environment at 902 can include identifying (physical) reference surfaces in the AR environment. In other words, the device 202 can identify surface planes (reference surfaces) of physical objects (e.g., a floor, a table, etc.) that are represented in the AR environment, such as the surfaces 610 and 620 shown in FIG. 6.

At 904, an indication to place an AR object (AR character, virtual character, virtual sticker, etc.) in the AR environment (e.g., on a reference surface) can be received.

At 906, in response to the indication at 904, the AR object can be placed in the AR environment. For instance, the AR object can be place on a first reference surface of the AR environment. In some implementations, such as those described herein, a shadow of the virtual character and/or a pattern to indicate placement of the AR object is complete can be displayed on the first reference surface at 906.

At 908, a first gesture can be performed. For example, a two-finger gesture can be performed on the AR object.

At 910, in response to the first gesture, the AR object can be elevated above the reference surface on which it was placed at 906. In some implementations, elevating the AR object can include displaying a visual elevation affordance (e.g., using a tether line) and/or adjusting a size of the AR object's shadow shown in the AR environment.

At 912, a second gesture can be performed. For example, a one-finger gesture can be performed on the elevated AR object.

At 914, in response to the second gesture at 912, the AR object can be moved in the AR environment. For instance, the AR object can be moved such that the reference for elevation of the AR object changes from a first reference surface to a second reference surface, such as using the approaches described herein. In some implementations, moving the AR object can included moving a visual elevation affordance, a shadow and/or a placement indication pattern corresponding with the AR object.

Figure 10:
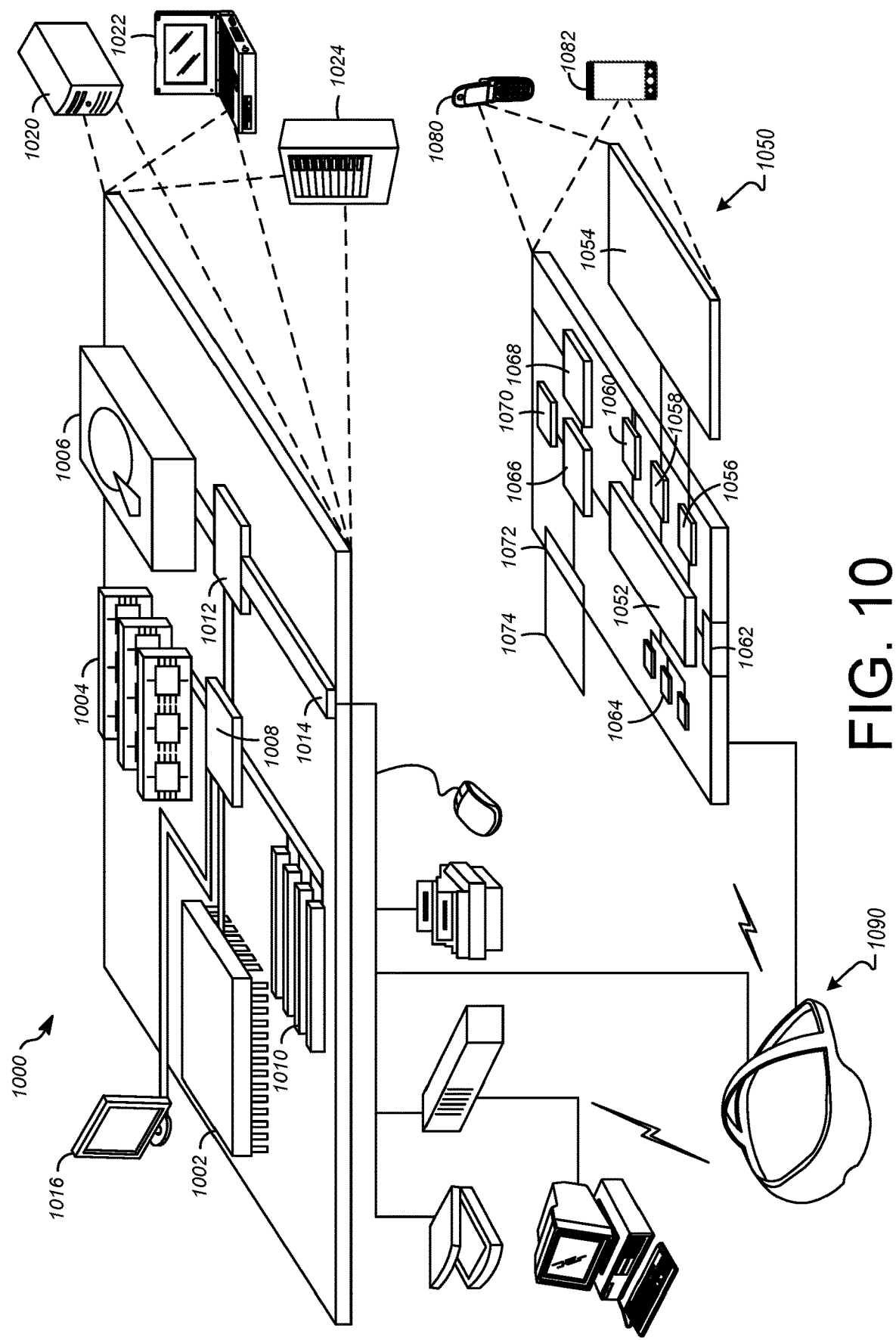
FIG. 10 shows an example of a computer device and a mobile computer device that can be used to implement the techniques described herein.

FIG. 10 shows an example of a computer device and a mobile computer device that can be used to implement the techniques described here. FIG. 10 shows an example of a generic computer device 1000 and a generic mobile computer device 1050, which may be used with the techniques described here. Computing device 1000 is intended to represent various forms of digital computers, such as laptops, desktops, tablets, workstations, personal digital assistants, televisions, servers, blade servers, mainframes, and other appropriate computing devices. Computing device 1050 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1000 includes a processor 1002, memory 1004, a storage device 1006, a high-speed interface 1009 connecting to memory 1004 and high-speed expansion ports 1010, and a low speed interface 1012 connecting to low speed bus 1014 and storage device 1006. The processor 1002 can be a semiconductor-based processor. The memory 1004 can be a semiconductor-based memory. Each of the components 1002, 1004, 1006, 1009, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1009. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1009 manages bandwidth-intensive operations for the computing device 1000, while the low speed controller 1012 manages lower bandwidth-intensive operations. Such allocation of functions is exemplary only. In one implementation, the high-speed controller 1009 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1069, among other components. The device 1050 may also be provided with a storage device, such as a microdrive or other device, to provide additional storage. Each of the components 1050, 1052, 1064, 1054, 1066, and 1069, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1059 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1059 may receive commands from a user and convert them for submission to the processor 1052. In addition, an external interface 1062 may be provide in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052, that may be received, for example, over transceiver 1069 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1069. In addition, short-range communication may occur, such as using a Bluetooth, WiFi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1090. It may also be implemented as part of a smart phone 1092, personal digital assistant, or other similar mobile device.

A user can interact with a computing device using a tracked controller 1094. In some implementations, the controller 1094 can track the movement of a user's body, such as of the hand, foot, head and/or torso, and generate input corresponding to the tracked motion. The input can correspond to the movement in one or more dimensions of motion, such as in three dimensions. For example, the tracked controller can be a physical controller for a VR application, the physical controller associated with one or more virtual controllers in the VR application. As another example, the controller 1094 can include a data glove.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 10 can include sensors that interface with a virtual reality (VR headset 1095). For example, one or more sensors included on a computing device 1050 or other computing device depicted in FIG. 10, can provide input to VR headset 1095 or in general, provide input to aVR space. The sensors can include, but are not limited to, a touchscreen, accelerometers, gyroscopes, pressure sensors, biometric sensors, temperature sensors, humidity sensors, and ambient light sensors. The computing device 1050 can use the sensors to determine an absolute position and/or a detected rotation of the computing device in the VR space that can then be used as input to the VR space. For example, the computing device 1050 may be incorporated into the VR space as a virtual object, such as a controller, a laser pointer, a keyboard, a weapon, etc. Positioning of the computing device/virtual object by the user when incorporated into the VR space can allow the user to position the computing device to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 1050 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 1050 when the computing device is incorporated into the VR space can cause a particular action to occur in the VR space.

In some implementations, a touchscreen of the computing device 1050 can be rendered as a touchpad in VR space. A user can interact with the touchscreen of the computing device 1050. The interactions are rendered, in VR headset 1095 for example, as movements on the rendered touchpad in the VR space. The rendered movements can control objects in the VR space.

In some implementations, one or more output devices included on the computing device 1050 can provide output and/or feedback to a user of the VR headset 1095 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 1050 may appear as another object in a computer-generated, 3D environment. Interactions by the user with the computing device 1050 (e.g., rotating, shaking, touching a touchscreen, swiping a finger across a touch screen) can be interpreted as interactions with the object in the VR space. In the example of the laser pointer in a VR space, the computing device 1050 appears as a virtual laser pointer in the computer-generated, 3D environment. As the user manipulates the computing device 1050, the user in the VR space sees movement of the laser pointer. The user receives feedback from interactions with the computing device 1050 in the VR space on the computing device 1050 or on the VR headset 1095.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:
receiving, by an electronic device, data defining an augmented reality (AR) environment;
receiving an indication to place an AR object on a reference surface in the AR environment;
in response to the indication, displaying the AR object on the reference surface in the AR environment;
performing a first gesture on an input device of the electronic device, the first gesture elevating the AR object a distance above the reference surface in the AR environment;
after, and in response to completion of the first gesture:
 displaying the AR object as floating at the distance above the reference surface in the AR environment; and
 displaying, in the AR environment, a tether line between the AR object and the reference surface, the tether line indicating that the AR object is the distance above the reference surface;
performing a second gesture on the input device of the electronic device; and
in response to the second gesture, moving the AR object in the AR environment.

2. The method of claim 1, wherein the tether line includes an indication of a point of origin on the reference surface, the point of origin being a location of the AR object on the reference surface prior to the elevation of the AR object.

3. The method of claim 1, wherein the reference surface is a first reference surface and the moving the AR object in the AR environment includes moving the AR object over a second reference surface in the AR environment, the method further comprising:
in response to the moving the AR object over the second reference surface, displaying the AR object, in the AR environment, as floating the distance above the second reference surface.

4. The method of claim 3, further comprising displaying, in the AR environment, the tether line between the AR object and the second reference surface, the tether line indicating that the AR object is the distance above the second reference surface.

5. The method of claim 4, wherein the first reference surface corresponds with a first physical object displayed in the AR environment, and the second reference surface corresponds with a second physical object in the AR environment.

6. The method of claim 1, further comprising:
displaying, on the reference surface in the AR environment, a shadow of the AR object; and
changing a size of the shadow in response to the elevation of the AR object.

7. The method of claim 1, further comprising displaying a pattern under the AR object in the AR environment, the pattern indicating that the AR object has been placed on the reference surface.

8. The method of claim 1, wherein the AR object is a virtual character.

9. A system, comprising:
a computing device including:
 a memory storing executable instructions; and
 a processor configured to execute the instructions to cause the computing device to:
  receive data defining an augmented reality (AR) environment;
  receive an indication to place an AR object on a first reference surface in the AR environment;
  in response to the indication, display the AR object on the first reference surface in the AR environment;
  receive a first gesture on an input device of the computing device, the first gesture elevating the AR object a distance above the first reference surface in the AR environment;
  after, and in response to completion of the first gesture:
   display the AR object as floating at the distance above the first reference surface in the AR environment; and
   display, in the AR environment, a tether line between the AR object and the first reference surface, the tether line indicating that the AR object is the distance above the first reference surface;

receive, with the AR object displayed as floating at the distance above the first reference surface, a second gesture on the input device of the computing device;

in response to the second gesture, move the AR object over a second reference surface in the AR environment; and in response to the moving the AR object over the second reference surface, display the AR object, in the AR environment, as floating at the distance above the second reference surface.

10. The system of claim 9, wherein the tether line includes an indication of a point of origin on the first reference surface, the point of origin being a location of the AR object on the first reference surface prior to the elevation of the AR object.

11. The system of claim 9, wherein the processor is further configured to execute the instructions to cause the computing device to:

display, in the AR environment, a tether line between the AR object and the second reference surface, the tether line indicating that the AR object is the distance above the second reference surface.

12. The system of claim 9, wherein the first reference surface corresponds with a first physical object displayed in the AR environment, and the second reference surface corresponds with a second physical object in the AR environment.

13. The system of claim 9, wherein the processor is further configured to execute the instructions to cause the computing device to:

display, on the first reference surface in the AR environment, a shadow of the AR object; and change a size of the shadow in response to the elevation of the AR object.

14. The system of claim 9, wherein the processor is further configured to execute the instructions to cause the computing device to:

display a pattern under the AR object in the AR environment, the pattern indicating that the AR object has been placed on the first reference surface.

15. The system of claim 9, wherein the AR object is a virtual character.

16. A non-transitory computer-readable medium having instructions stored thereon, the instructions, when executed by a processor of an electronic device, cause the electronic device to:

receive data defining an augmented reality (AR) environment;

receive an indication to place an AR object on a reference surface in the AR environment;

in response to the indication, display the AR object on the reference surface in the AR environment;

display a pattern under the AR object in the AR environment, the pattern indicating that the AR object has been placed on the reference surface;

receive a first gesture on an input device of the electronic device, the first gesture elevating the AR object a distance above the reference surface in the AR environment;

after, and in response to completion of the first gesture:
 display the AR object as floating the distance above the reference surface in the AR environment; and
 display, in the AR environment, a tether line between the AR object and the reference surface, the tether line indicating that the AR object is the distance above the reference surface.

17. The non-transitory computer-readable medium of claim 16, wherein the tether line includes an indication of a point of origin on the reference surface, the point of origin being a location of the AR object on the reference surface prior to the elevation of the AR object.

* * * * *